United States Patent [19]
Tachibana et al.

[11] Patent Number: 5,856,874
[45] Date of Patent: Jan. 5, 1999

[54] OPTICAL GAUGE WITH ADJUSTABLE LIGHT PATH BENDING MIRROR

[75] Inventors: Shunsaku Tachibana; Yukiji Yoda; Kenji Okabe, all of Kawasaki, Japan

[73] Assignee: Mitutoyo Corporation, Kawasaki, Japan

[21] Appl. No.: 825,619

[22] Filed: Mar. 31, 1997

[30] Foreign Application Priority Data

Apr. 5, 1996 [JP] Japan .................................. 8-083726

[51] Int. Cl.$^6$ ............................ G01B 11/02; G01B 11/24
[52] U.S. Cl. ........................................................ 356/376
[58] Field of Search ................................... 356/376, 237, 356/241

[56] References Cited

U.S. PATENT DOCUMENTS

| | | | |
|---|---|---|---|
| 4,421,410 | 12/1983 | Karasaki . | |
| 5,097,119 | 3/1992 | Breitmeier | 356/376 |
| 5,140,643 | 8/1992 | Izumi et al. | 356/237 |
| 5,452,080 | 9/1995 | Tomiya | 356/237 |

FOREIGN PATENT DOCUMENTS

| | | |
|---|---|---|
| A 0-265769 | 5/1988 | European Pat. Off. . |
| A 0-488292 | 6/1992 | European Pat. Off. . |
| 3840820 | 6/1990 | Germany ................................ 356/376 |
| 60-10141 | 1/1985 | Japan ..................................... 356/241 |
| 761243 | 11/1956 | United Kingdom . |
| 913299 | 12/1962 | United Kingdom . |
| A 2264601 | 9/1993 | United Kingdom . |

*Primary Examiner*—F. L. Evans
*Attorney, Agent, or Firm*—Oliff & Berridge, PLC

[57] ABSTRACT

In an optical gauge according to the invention, a mirror holder ring 21 is fitted to the outer periphery of the objective lens 12 and an light path bending mirror 22 is rotatably secured at the upper end thereof to the mirror holder ring 21. With such an arrangement, the light downwardly emitted from an optical system 3 irradiates the top plane of an object of measurement when the light path bending mirror 22 is held in parallel with the optical axis of the optical system 3. On the other hand, the light emitted from the optical system 3 is rectangularly turned to irradiate a lateral plane of the object of measurement when the light path bending mirror 22 is turned around its upper end to a position where it is inclined by 45° relative to the optical axis of the optical system 3. Thus, an optical gauge according to the invention can observe one or more than one lateral sides of the object of measurement for dimensional measurement without modifying its attitude.

10 Claims, 7 Drawing Sheets

F I G. 1
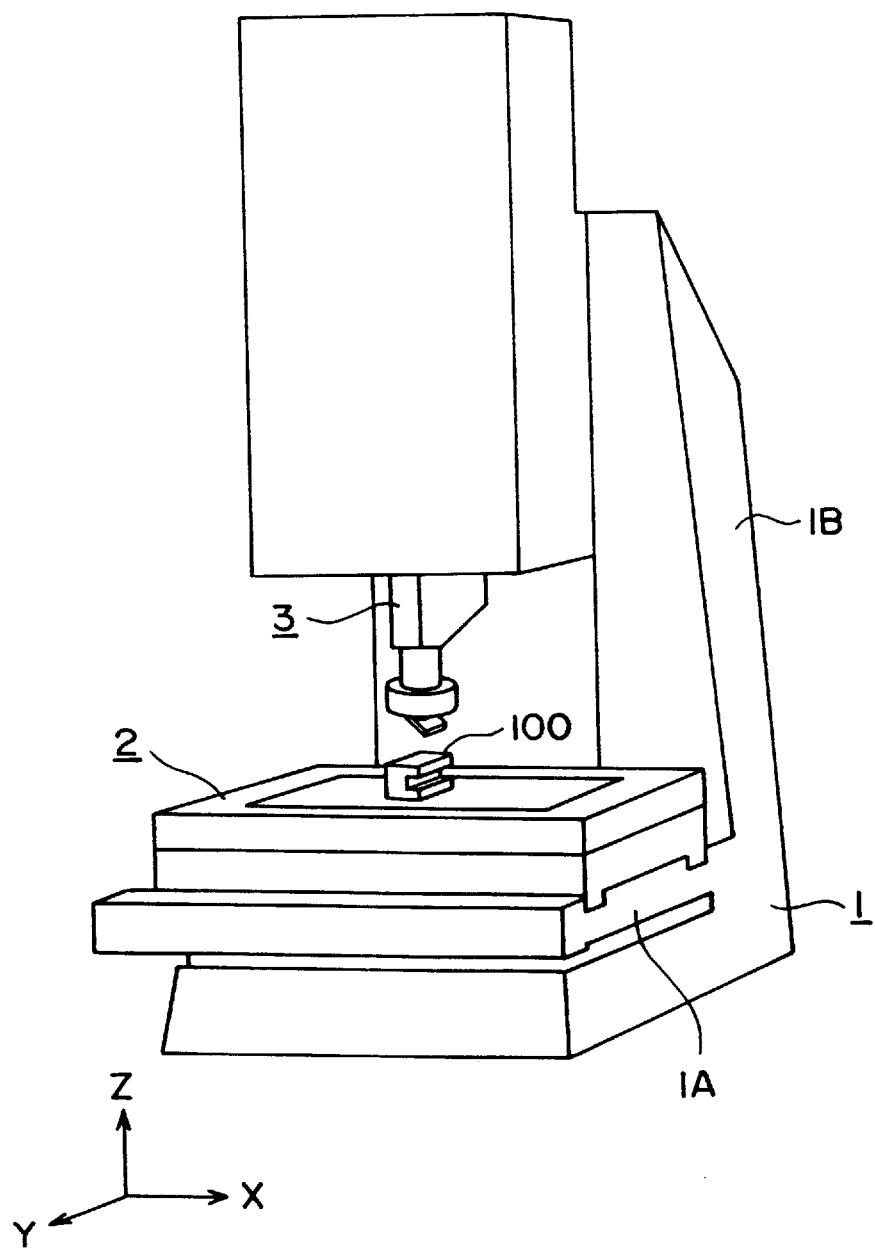

F I G. 2
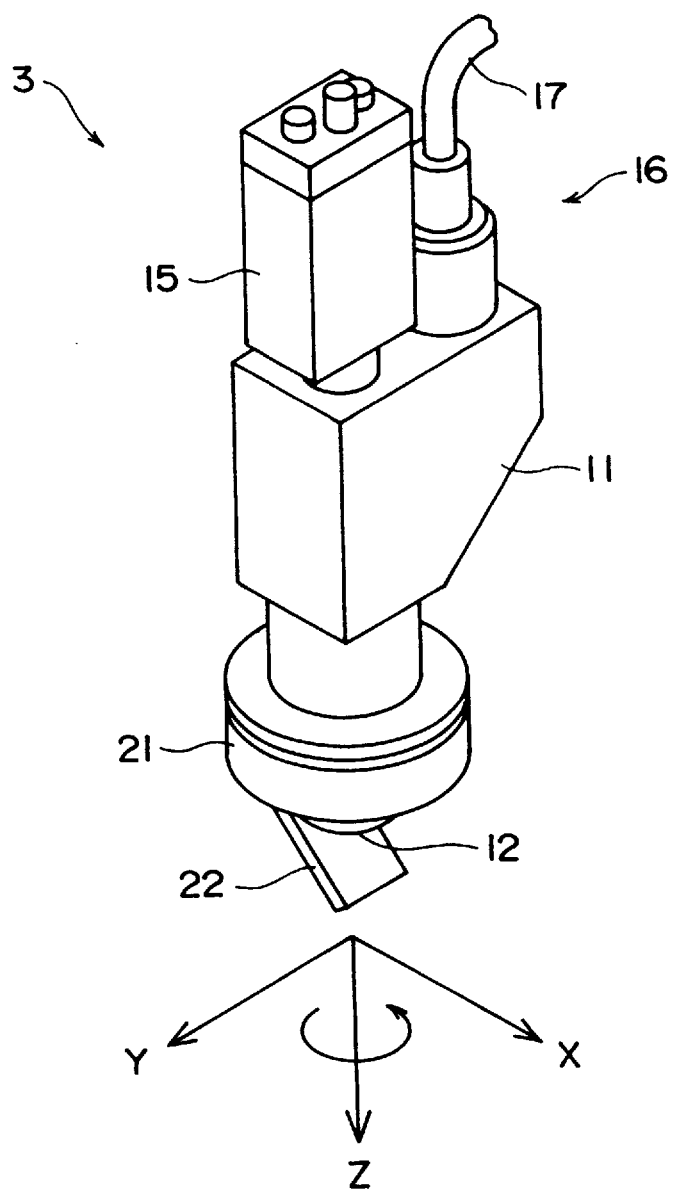

OPTICAL GAUGE WITH ADJUSTABLE LIGHT PATH BENDING MIRROR

BACKGROUND OF THE INVENTION

1. FIELD OF THE INVENTION

This invention relates to an optical gauge for measuring more than one dimensions and determining the profile of an object by detecting the light reflected by or transmitted through the object that is placed on a table.

2. DESCRIPTION OF RELATED ART

Known optical gauges for measuring more than one dimensions and determining the profile of an object by detecting the light reflected by or transmitted through the object typically comprise an optical system that is arranged above a table carrying the object thereon and operated to irradiate the object with rays of light and receive the reflected light in order to determine the dimensions and the profile of the object.

Known optical gauges with such a positional arrangement can observe only the surface of the object disposed vis-a-vis the optical system because the latter is located above the table carrying the object thereon and designed to downwardly emit rays of light. In other words, the object has to be turned to change its attitude when the lateral and bottom sides of the object have to be gauged because the gauge cannot see them unless the object is turned.

For example, referring to FIG. 8 of the accompanying drawings, when holes $102_1$ and $102_2$ bored on plane 101 of the object to be measurement 100 are to be measured for respective diameters $D_1$ and $D_2$ and distance L separating them along with width W of groove 104 formed on plane 103 that is perpendicular to plane 100, the operator will firstly place the object 100 on the table with the plane 101 facing upward and measure the diameters $D_1$ and D2 of the respective holes $102_1$ and $102_2$ and the distance L between the holes. Then, he or she will have to turn the object 100 by 90° to make the plane 103 face upward on the table before measuring the width W of the groove 104.

Thus, when the object to be measurement has a plurality of planes to be observed for measurement, each of the planes has to be made to face upward on a one-by-one basis and centered before it is actually observed for measurement. The overall measuring operation is rather inefficient because it is time consuming and cumbersome.

Therefore, the object of the present invention is to provide an optical gauge adapted to observe a plurality of different planes of an object to be measurement without modifying the attitude of the object that is placed on a table.

SUMMARY OF THE INVENTION

According to a first aspect of the invention, the above object is achieved by providing an optical gauge having a table for carrying thereon an object to be measurement and an optical system so arranged as to be movable relative to the table and adapted to receive the light reflected by or transmitted through the object placed on the table to measure more than one dimensions and determine the profile of the object on the basis of the image obtained by the optical system, characterized in that it comprises an optical device for turning the optical path of the light reflected by or transmitted through the object to be measurement and entering it into the optical system.

With such an arrangement, the light path of the light (including natural light) reflected by and/or transmitted through the object to be measurement placed on the table and entering the optical device is turned. For example, if the light path of the light reflected by a first one of the planes of the object is turned to the direction along which the light reflected by a second one of the planes that is perpendicular to the first one, the two planes of the object to be measurement perpendicularly intersecting each other can be observed at the same time. In this way, a plurality of planes of the object to be measurement can be observed for measurement without modifying the attitude of the object that is placed on the table.

According to a second aspect of the invention, there is provided an optical gauge having a table for carrying thereon an object to be measurement and an optical system so arranged as to be movable relative to the table and adapted to irradiate the object with light downwardly from above and receive the light reflected by the object placed on the table to measure more than one dimensions and determine the profile of the object on the basis of the image obtained by the optical system, characterized in that it comprises an optical device for irradiating a lateral side of the object with light by turning the optical path of the light emitted from the optical system and entering the light reflected by the object into the optical system.

With the above arrangement, the light path of the light emitted downwardly from the optical system toward the table is turned by the optical device to irradiate a lateral side of the object with light. The light path of the light reflected by the object to be measurement is also turned to enter the optical system so that the lateral side of the object placed on the table can be observed to measure one or more than one dimensions and determine the profile of the lateral side of the object. Of the light emitted downwardly toward the table from the optical system, the fraction directed to the upper surface of the object is reflected by it and reenter the optical system so that the upper surface of the object can also be observed to dimensionally measure one or more than one dimensions and determine the profile of the upper surface of the object. In this way, a plurality of planes of the object to be measurement can be observed for measurement without modifying the attitude of the object that is placed on the table.

While the optical device may be a half mirror or a prism, preferably the optical device comprises a light path bending mirror from the viewpoint of cost.

Such a light path bending mirror may be fitted to the table or to the optical system. If the light path bending mirror is fitted to the optical system, preferably the upper end of the light path bending mirror is pivotally secured to a lower end portion of the optical system such that the former is supported by an axis perpendicular to the optical axis of the optical system and rotatable between a position parallel to the optical axis of the optical system and an angular portion intersecting the optical axis of the optical system and inclined relative to the latter.

With such an arrangement, the upper surface, of the object of measurement can be observed for a normal operation mode when the light path bending mirror is turned around its axis at the upper end thereof to a position parallel to the optical axis, whereas a lateral side of the object can be observed for a side measuring mode when the light path bending mirror is turned around its axis at the upper end thereof to a position intersecting the optical axis of the optical system so that mode selecting operation can be carried out easily and quickly. For the mode selecting operation of rotating the light path bending mirror, preferably an optical gauge according to the invention is provided with a mirror kick-up motor for rotating the light path bending mirror between a position parallel to the optical axis of the optical system and an angular portion intersecting the optical axis of the optical system and inclined relative to the latter. With such an arrangement, the mirror can be driven to rotate not manually but automatically for mode selecting operation easily and quickly.

Alternatively, it may be so arranged that the light path bending mirror is rotatable around the optical axis of the optical system. Then, more than one lateral sides of the object to be measurement can be observed for determining dimensions and the profile thereof without modifying the attitude of the object placed on the table. If such is the case, preferably an optical gauge according to the invention is provided with a mirror rotation motor for rotating the light path bending mirror (around the optical axis of the optical system). Then, the mode selecting operation of rotating the light path bending mirror for observing more than one lateral sides of the object to be measurement can also be carried out easily and quickly.

While the optical system may have any configuration so long as it is designed to emit light downwardly from above the table and receive the light reflected by the object to be measurement placed on the table, preferably it comprises a case, an objective lens fitted to the bottom of the case, a beam splitter arranged on the optical axis of the objective lens and an image pick-up means for picking up the optical image brought to it by the light reflected by the object to be measurement via the beam splitter.

According to a third aspect of the invention, there is provided an optical gauge having a table for carrying thereon an object to be measurement and an optical system so arranged as to be movable relative to the table and adapted to irradiate the object with light downwardly from above the table and receive the light reflected by the object placed on the table to measure more than one dimensions and determine the profile of the object on the basis of the image obtained by the optical system, characterized in that it comprises a mirror holder ring fitted to a lower end portion of the optical system and rotatable around the optical axis of the optical system, an light path bending mirror secured to the mirror holder ring such that the former is rotatable around an axis perpendicular to the optical axis of the optical system to turn the light path originating from the optical system in order to irradiate a lateral side of the object to be measurement with light and turn back the light reflected by the object to make it enter the optical system and a mirror rotary angle sensor for detecting the rotary angle of the light path bending mirror around the optical axis.

With such an arrangement, the mode selecting operation of rotating the light path bending mirror for observing more than one lateral sides of the object to be measurement can be carried out easily and quickly by using a set of coordinate transformation data corresponding to the rotary angle of the light path bending mirror detected by the mirror rotary angle sensor for detecting the rotary angle of the light path bending mirror around its optical axis.

BRIEF DESCRIPTION OF THE DRAWINGS

FIG. 1 is a schematic perspective view of an embodiment of optical gauge according to the invention.

FIG. 2 is a schematic perspective view showing the optical system of the embodiment of FIG. 1.

DETAILED DESCRIPTION OF THE PREFERRED EMBODIMENT(S)

Now, the present invention will be described in greater detail by referring to the accompanying drawings that illustrate preferred embodiments of the invention.

FIG. 1 is a schematic perspective view of an embodiment of optical gauge according to the invention. The gauge comprises a main body 1 having a horizontal section 1A and an elevated section 1B, a table 2 arranged on the horizontal section 1A to carry an object to be measurement on the upper surface thereof and movable transversally and longitudinally (along X- and Y-axes) and an optical system 3 vertically movably (along Z-axis) fitted to the elevated section 1B of the main body in order to emit light downwardly (toward the table 2) and receive the light reflected by the object to be measurement. The table 2 and the optical system 3 are movable relative to each other three-directionally (along X-, Y- and Z-axes).

Figure 3:
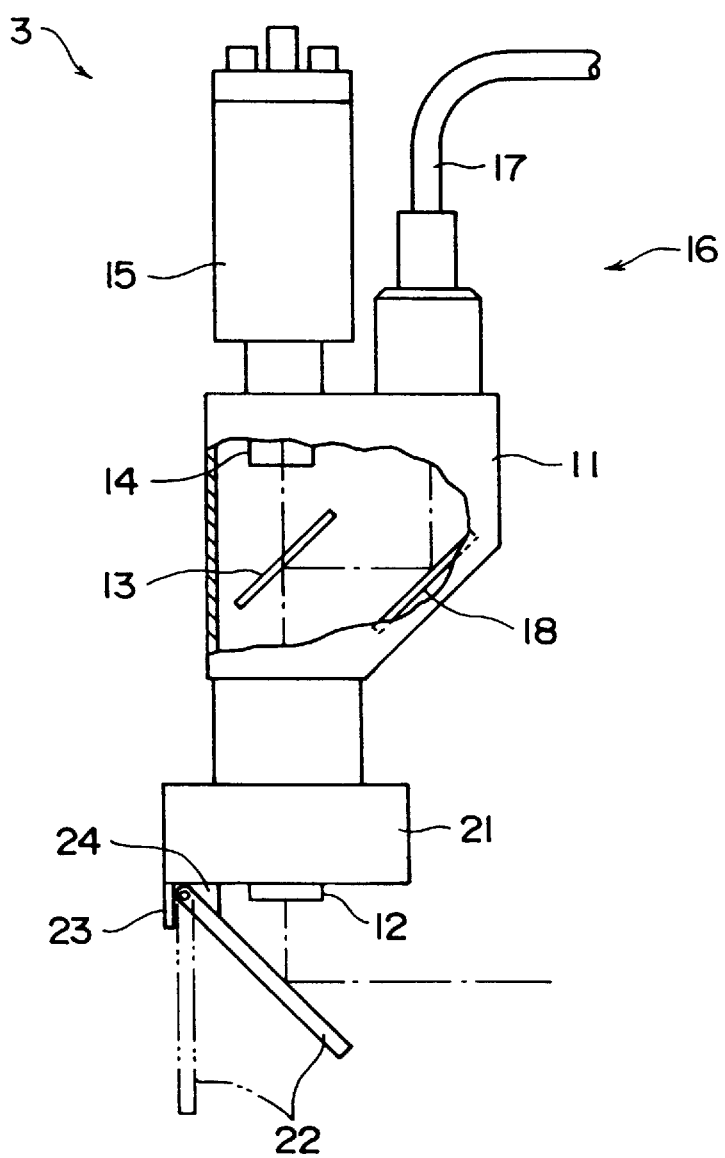
FIG. 3 is a schematic lateral view showing the optical system of the embodiment of FIG. 1.

FIG. 2 is a schematic perspective view of the optical system 3 and FIG. 3 is a schematic lateral view of the optical system 3 partially broken to show the inside. The optical system 3 comprises a case 11, an objective lens 12 fitted to the bottom of the case 11, a beam splitter 13 arranged on the optical axis of the objective lens 12, a CCD camera 15 for picking up optical images and a set of lighting equipment 16 for emitting light toward the table. The lighting equipment 16 includes a light source (not shown), an optical fiber 17 for leading the light emitted from the light source through the case 11 and a mirror 18 for reflecting the light led to the case 11 toward the beam splitter 13.

A mirror holder ring 21 is fitted to the outer periphery of the objective lens 12 in such a way that it is rotatable around the optical axis. A light path bending mirror 22 is fitted to the underside of the mirror holder ring 21 and operates as an optical device that turns the light path from the optical system 3 so as to irradiate a lateral side of the object to be measurement 100 with light and also that of the light reflected by the object to be measurement 100 to make the light reenter the optical system 3. First and second stopper 23 and 24 are also fitted to the underside of the mirror holder ring 21 such that the light path bending mirror 22 is held to an axis perpendicular to the optical axis of the optical system 3 at the underside of the mirror holder ring 21 and rotatable between a position abutting the first stopper 23 (and parallel to the optical axis of the optical system 3) and a position abutting the second stopper 24 (and intersecting the optical axis of the optical system 3 at an angle of 45°).

Figure 4:
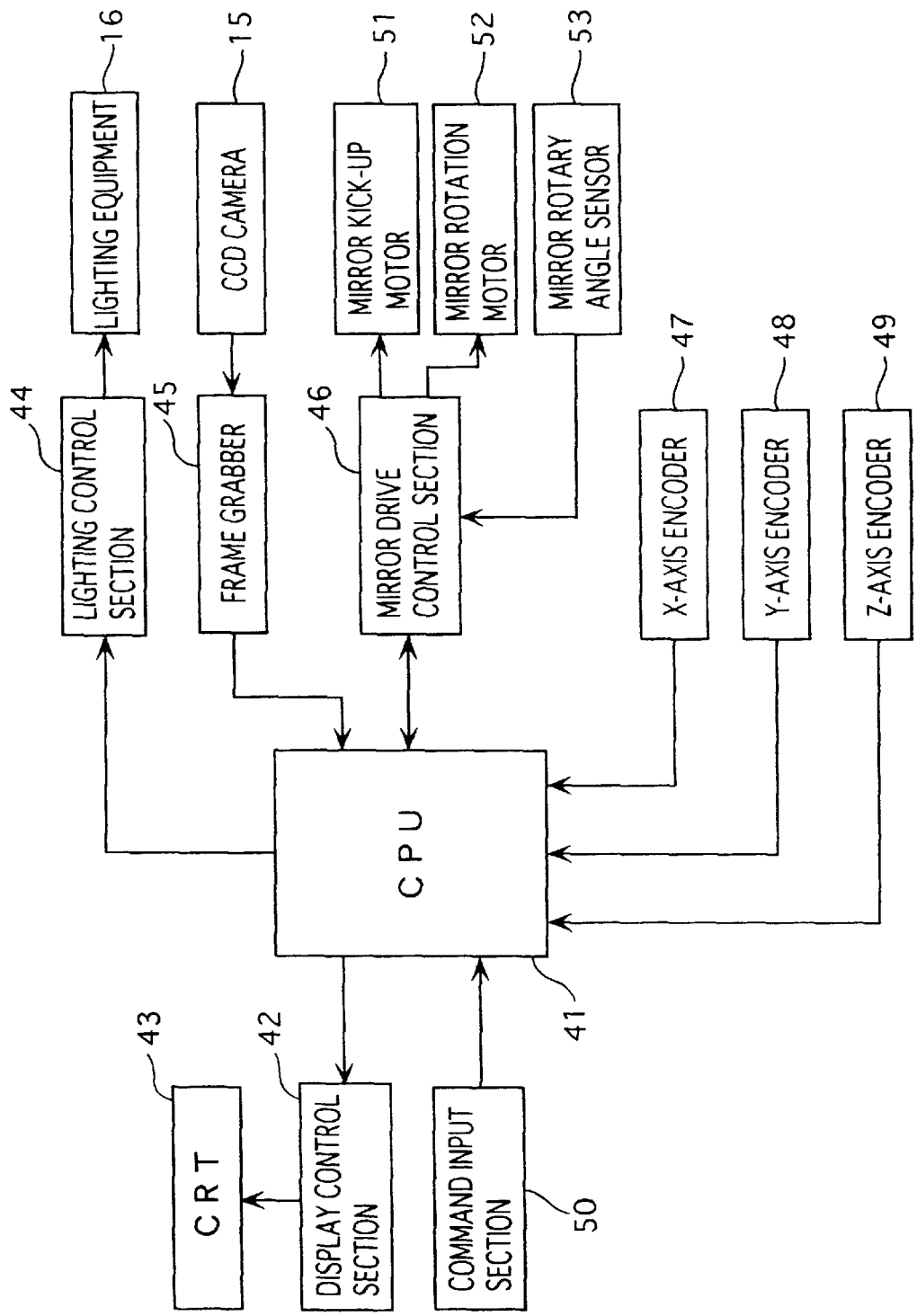
FIG. 4 is a block diagram showing the control unit of the embodiment of FIG. 1.

FIG. 4 is a block diagram of the control unit of the embodiment of optical gauge of FIG. 1 having a CPU 41. The CPU 41 is connected to a CRT 43 by way of a display control section 42, to the lighting equipment 16 by way of a lighting control section 44 and to the CCD camera 15 by way of a frame grabber 45. It is also connected to a mirror drive section 46, an X-axis encoder 46 for sensing the position of the table 2 along the X-axis, a Y-axis encoder 47 for sensing the position of the table 2 along the Y-axis, a Z-axis encoder 49 for sensing the position of the optical system 3 along the Z-axis and a command input section 50.

The mirror drive section 46 by turn is connected to a mirror kick-up motor 51 for kicking up the lower end of the light path bending mirror 22 to make it pivot around its axis of rotation located at the upper end thereof, a mirror rotation motor 52 for rotating the mirror holder ring 21 around the optical axis and a mirror rotary angle sensor 53 for detecting the rotary angle of the mirror holder ring 21 rotated by the mirror rotary motor 52 (and therefore that of the light path bending mirror 22).

Figure 5:
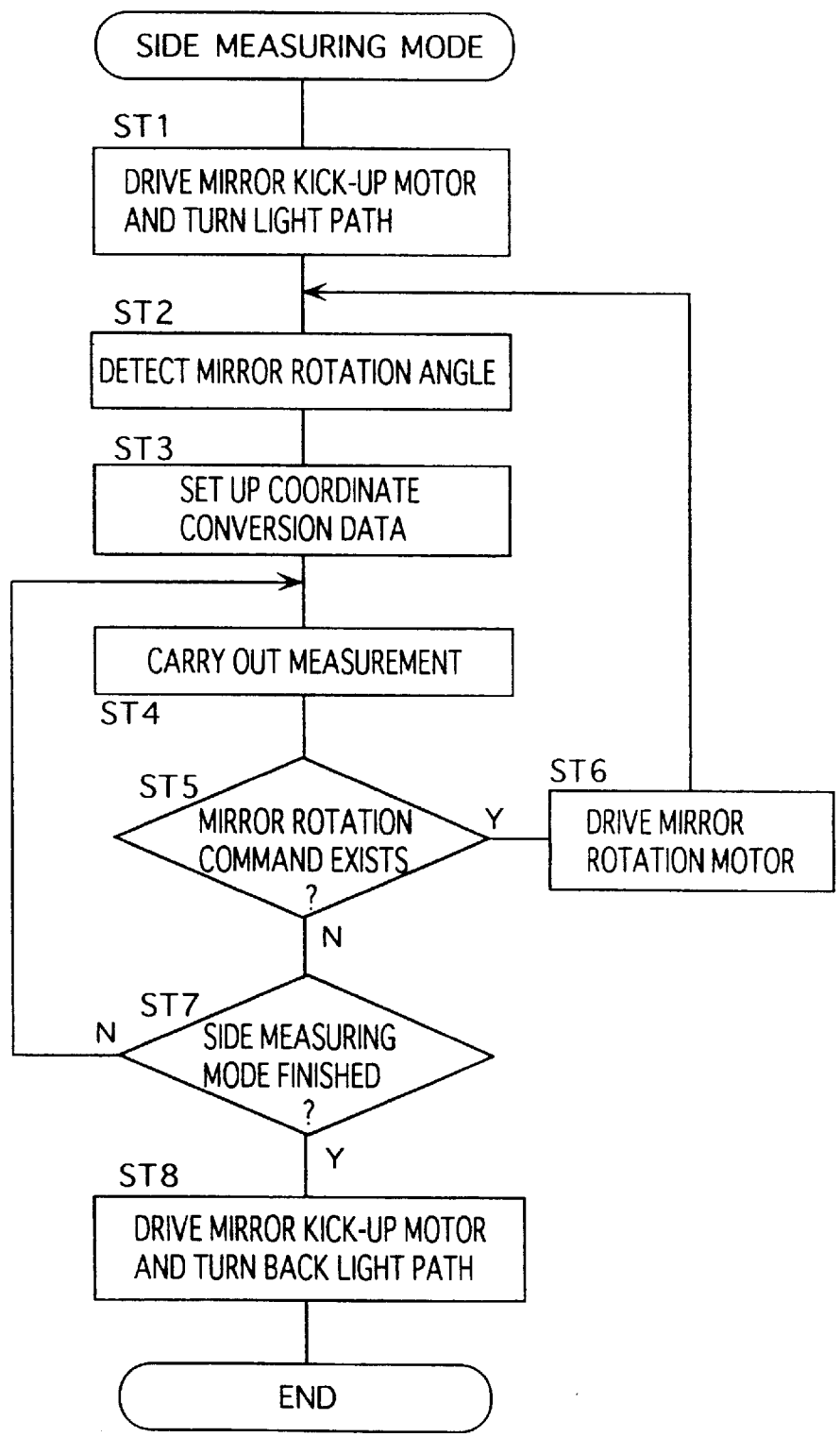
FIG. 5 is a flow chart of the operation of the embodiment of FIG. 1 in a side measuring mode.

Now, the operation of the above embodiment will be described by referring to the flow chart of FIG. 5.

Assume that an object to be measurement 100 is placed on the table 2 with plane 101 facing upward in order to firstly measure the diameters $D_1$ and $D2$ of respective holes $102_1$ and $102_2$ bored on the plane 101 in a normal operation mode and then secondly, after switching to a side measuring mode, to measure the width W of groove 104 formed on plane 103.

In the normal operation mode, the light path bending mirror 22 abuts the first stopper 23 and therefore is held in parallel with the optical axis of the optical system 3. Thus, the light emitted from the optical fiber 17 of the lighting equipment 16 is reflected by the mirror 18 to irradiate the top plane 101 of the object to be measurement 100 by way of the beam splitter 13 and the objective lens 12. Therefore, the light reflected by the plane 101 (top plane) of the object of measurement 100 is received by the CCD camera 15 by way of the objective lens 12, the beam splitter 13 and the tube lens 14 so that the diameters $D_1$ and $D_2$ of the respective holes $102_1$ and $102_1$ on the plane (top plane) 101 can be determined along with the distance L separating them.

Then, a side measuring mode is selected by the command input section 50. The CPU 41 carries out a measuring operation according to the flow chart of FIG. 5. In Step (hereinafter referred to ST) 1, it drives the mirror kick-up motor 51 to turn the light path. As the mirror kick-up motor 51 is driven to operate, the mirror 22 is driven to rotate from the position indicated by the double-dotted lines in FIG. 3 to the position indicated by the solid lines so that the light coming out from the objective lens 12 is rectangularly reflected by the mirror 22 (and therefore bent to a direction substantially parallel to the upper surface of the table 2) to irradiate a lateral side of the object to be measurement 100 which is plane 103.

Then, in ST2, the mirror rotary angle sensor 53 detects the rotary angle of the mirror 22 and the CPU 41 proceeds to ST3 to use a set of coordinate transformation data according to the rotary angle of the mirror 22. Thereafter, in ST4, the CPU 41 actually carries out a measuring operation, where the light reflected by the plane 103 (lateral plane) of the object to be measurement 100 is received by the CCD camera 15 by way of the mirror 22, the objective lens 12, the beam splitter 13 and the tube lens 14 to tell the width W of the groove 104 on the plane 103 (lateral plane) of the object to be measurement 100.

Subsequently, in ST5, the CPU 41 checks if there is a mirror rotation command issued from the command input section 50 or not. If there is a mirror rotation command, it proceeds to ST6, where it drives the mirror rotary motor 52 to rotate the mirror holder ring 21 and then returns to ST2. If, on the other hand, there is not a mirror rotation command, it checks if the side measuring mode is finished or not and returns to ST4.

Finally, in ST8, the CPU 41 drives the motor 51 to restore the original light path.

Thus, with the above described embodiment of the invention, the optical system 3 is provided at a bottom end portion thereof with a light path bending mirror 22 for rectangularly turning the light path coming from the optical system and leading the reflected light coming along the light path back to the optical system 3 so that the light emitted vertically downwardly from the optical system 3 is reflected by the mirror 22 to proceed in parallel with the upper surface of the table 2 and irradiate the plane (lateral plane) 103 of the object to be measurement 100. Then, the light reflected by the plane (lateral plane) 103 of the object to be measurement 100 is rectangularly turned by the mirror 22 to get back into the optical system 3. Therefore, the plane (lateral plane) 103 of the object to be measurement 100 placed on the table 2 can be observed to determine one or more dimensions thereof without modifying the attitude of the object 100.

Additionally, the light path bending mirror 22 is pivotally secured at the upper end thereof to a lower end portion of the optical system 3 such that it is rotatable around an axis perpendicular to the optical axis of the optical system 3. Thus, the light path bending mirror 22 is freed from the optical axis of the optical system 3 when it is turned around the axis of rotation to a position where it is held in parallel with the optical axis of the optical system 3 so that the top plane 103 of the object to be measurement can be observed to determine one or more dimensions thereof in a normal operation mode. Then, the embodiment can be easily and quickly put into a side measuring mode to observe one of the lateral sides of the object to be measurement simply by turning the light path bending mirror 22 around its axis of rotation at the top thereof to a position where it is inclined by 45° relative to the optical axis of the optical system 3.

Since the light path bending mirror 22 is driven to rotate by a mirror kick-up motor 51 in the above embodiment, the mode selecting operation can be conducted automatically in an easy and quick manner.

Additionally, since a mirror holder ring 21 is fitted to the outer periphery of the objective lens 12 in such a way that it is rotatable around the optical axis of the optical system 3 and the light path bending mirror 22 is secured to the mirror holder ring 21, the light path bending mirror 22 is rotatable around the optical axis of the optical system so that more than one lateral sides of the object to be measurement 100 placed on the table 2 can be observed without modifying the attitude of the object to be measurement 100.

If it is so arranged that the light path bending mirror 22 is driven to rotate (around the optical axis of the optical system 3) by a mirror rotary motor 52, more than one lateral sides of the object to be measurement 100 can be observed with easy and quick switching motion.

Additionally, since the embodiment is provided with a mirror rotary angle sensor 53 for detecting the angle of rotation of the light path bending mirror 22, more than one lateral sides of the object to be measurement 100 can be easily observed for measuring dimensions and the profile by using a set of coordinate transformation data according to the rotary angle of the light path bending mirror 22 detected by the mirror rotary angle sensor 53 for each rotary motion.

Figure 6:
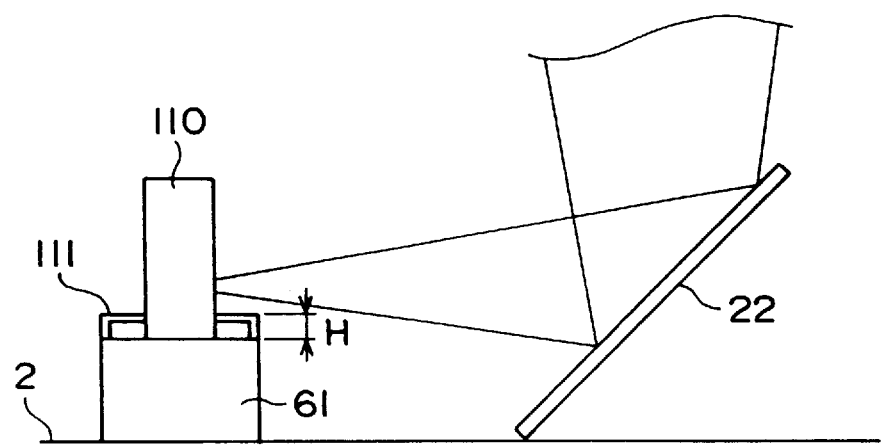
FIG. 6 is a schematic view showing another embodiment of optical gauge according to the invention.

While the above embodiment is so designed that the light path bending mirror 22 is pivotally secured to a lower end portion of the optical system 3, the light path bending mirror 22 may alternatively be secured to a portion of the upper surface of the table 2. Then, for measuring the height H of connector pins 111 of a connector 110 as shown in FIG. 6, the connector 110 may be placed in position on the upper surface of the table 2 with a stage 61 placed therebetween and the light path bending mirror 22 may be inclined by 45° to obliquely face the side to be observed (the side of the connector pins 111) and held to that angle.

Figure 7:
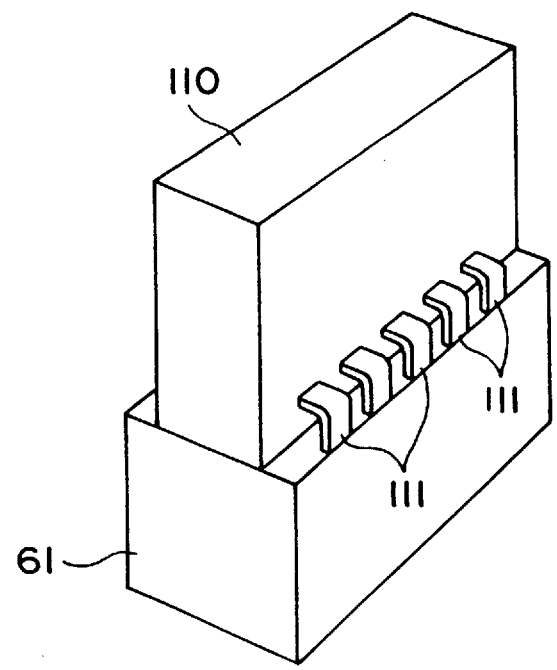
FIG. 7 is a perspective view showing the table of the embodiment of FIG. 6 carrying an object of measurement thereon.
Figure 8:
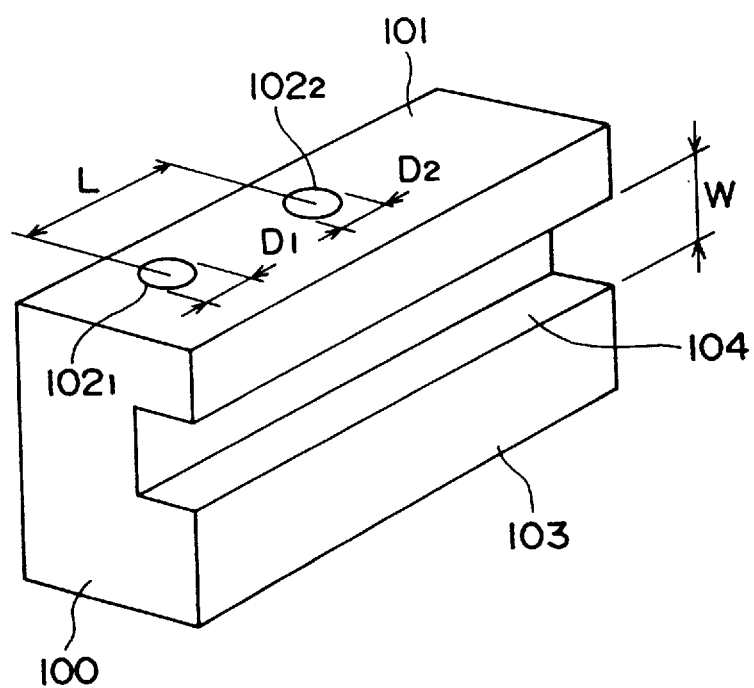
FIG. 8 is a perspective view showing a typical object to be measurement that can be observed by means of an optical gauge according to the invention.

With this arrangement, the light path bending, mirror 22 is firstly brought to a position right below the optical system 3 by moving the table 2 along the X- and Y-axes. Then, the light emitted from the optical system 3 is rectangularly turned by the light path bending mirror 22 to proceed in parallel with the upper surface of the table 2 and irradiate the connector pins 111 of the connector 110 so that the height H of the connector pins 111 can be measured on the basis of the light reflected by them. If the width of the stage 61 is made to exactly agree with that of the connector pins as shown in FIG. 7, the light turned by the light path bending mirror 22 may not undesirably hit the stage 61. A clear image of the edge of the stage 61 may be obtained when the upper and lateral surfaces thereof are processed for anti-reflection. The overall configuration of the above embodiment can be further simplified by replacing the light path bending mirror 22 of the above embodiment with a half-mirror or a prism because the mechanism for driving the light path bending mirror 22 to rotate can be omitted.

While the optical system 3 emits light downwardly and receives the light reflected by the object to be measurement in the above embodiment, the optical system 3 does not necessarily have to emit light and may be so designed that it simply received a fraction of natural light reflected by or transmitted through the object of measurement 100.

Thus, an optical gauge according to the invention can observe more than one sides of an object to be measurement placed on a table for dimensional measurement without changing its attitude.

What is claimed is:

1. An optical gauge having a table for carrying thereon an object to be measured and an optical system so arranged as to be movable relative to the table and having an objective lens located just above the table, a light source to irradiate the object placed on the table with light, and a light-receiving portion to receive the light reflected by or transmitted through the object, and through the objective lens, to measure a plurality of dimensions and determine the profile of the object on the basis of the image obtained by the optical system, the table and the optical system being capable of moving relative to each other in three different dimensions, wherein the optical gauge comprises:

a light path bending mirror for turning the optical path of the light source to irradiate a side of the object, and simultaneously bending the light path of the light reflected by or transmitted through the side of the object to let light into the optical system, wherein the light path bending mirror is rotatable around the optical axis of the objective lens.

2. An optical gauge according to claim 1, wherein the upper end of the light path bending mirror is pivotally secured to a lower end portion of the optical system such that the light path bending mirror is supported by an axis perpendicular to the optical axis of the optical system and rotatable between a position parallel to the optical axis of the optical system and an angular position intersecting the optical axis of the optical system and inclined relative to the optical axis.

3. An optical gauge according to claim 2, further including a mirror kick-up motor for rotating the light path bending mirror between a position parallel to the optical axis of the optical system and an angular position intersecting the optical axis of the optical system and inclined relative to the optical axis.

4. An optical gauge according to claim 3, further including a mirror rotation motor for rotating the light path bending mirror around the optical axis of the optical system.

5. An optical gauge according to claim 1, wherein the optical system comprises a case, an objective lens fitted to the bottom of the case, a beam splitter arranged on the optical axis of the objective lens and an image pick-up means for picking up the optical image brought to it by the light reflected by the object to be measured via the beam splitter.

6. An optical gauge having a table for carrying thereon an object of measurement and an optical system so arranged that said table and said optical system are movable relative to each other in three dimensions and adapted to irradiate the object with light downwardly from above and receive the light reflected by the object placed on the table to measure more than one dimension and determine the profile of the object on the basis of the image obtained by the optical system, wherein the optical gauge comprises:

a mirror holder ring fitted to a lower end portion of the optical system and rotatable around the optical axis of the optical system;

a light path bending mirror secured to the mirror holder ring such that the light path bending mirror is rotatable around an axis perpendicular to the optical axis of the optical system to turn the light path originating from the optical system in order to irradiate a lateral side of the object of measurement with light and turn back the light reflected by the object to make it enter the optical system; and a mirror rotary angle sensor for detecting the rotary angle of the light path bending mirror around the optical axis.

7. An optical gauge according to claim 6, wherein the upper end of the light path bending mirror is pivotally secured to the mirror holder ring such that the light path bending mirror is rotatable around an axis perpendicular to the optical axis of the optical system between a position parallel to the optical axis of the optical system and an angular position intersecting the optical axis of the optical system and inclined relative to the optical axis.

8. An optical gauge according to claim 7, further including a mirror kick-up motor for rotating the light path bending mirror between a position parallel to the optical axis of the optical system and an angular position intersecting the optical axis of the optical system and inclined relative to the optical axis.

9. An optical gauge according to claim 8, further including a mirror rotation motor for rotating the light path bending mirror around the optical axis of the optical system.

10. An optical gauge according to claim 9, wherein the optical system comprises a case, an objective lens fitted to the bottom of the case, a beam splitter arranged on the optical axis of the objective lens and an image pick-up means for picking up the optical image brought to it by the light reflected by the object of measurement via the beam splitter.

* * * * *